Jan. 10, 1928.
E. JOHNSON
1,655,612
SPOTLIGHT FOR AUTOMOBILES
Filed March 16, 1921
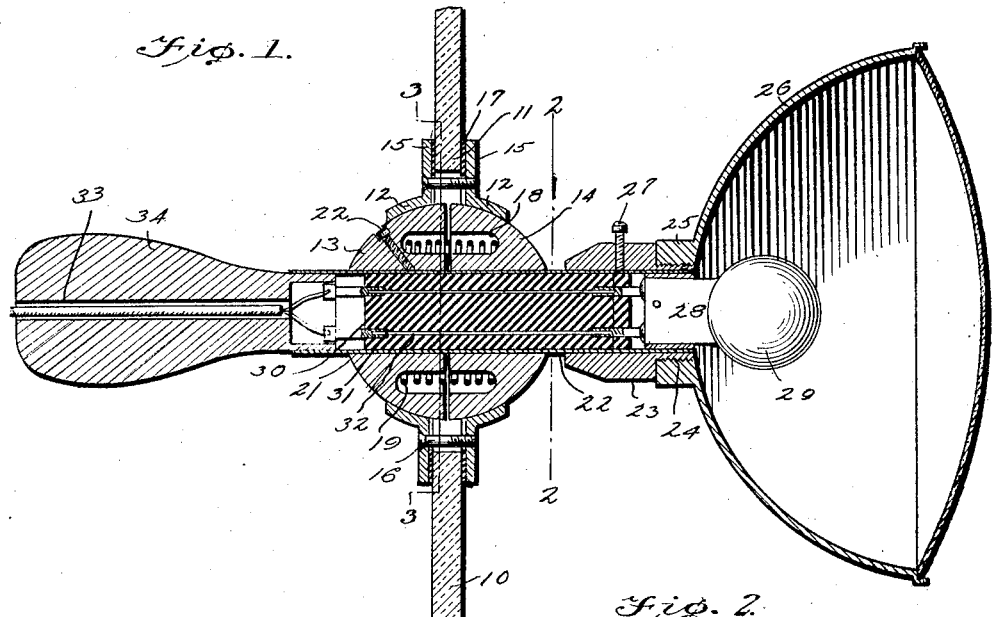
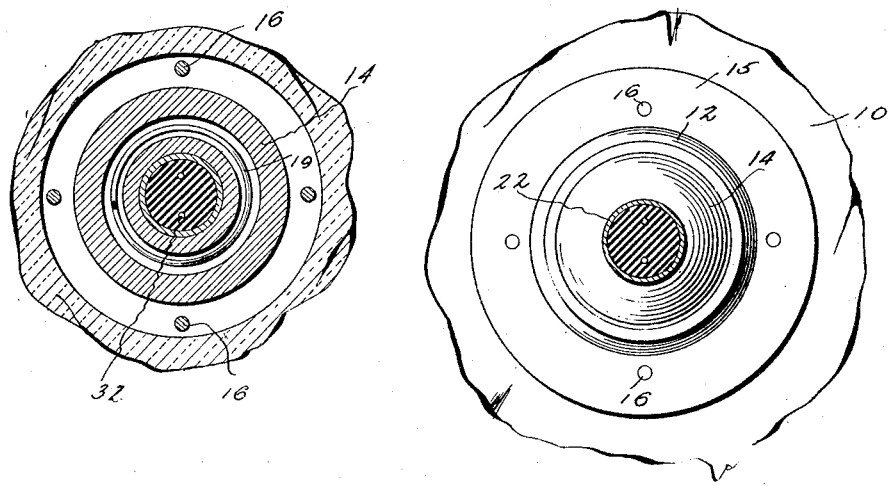
WITNESSES
INVENTOR
Ebert Johnson,
BY
ATTORNEYS Patented Jan. 10, 1928.

1,655,612

UNITED STATES PATENT OFFICE.

EBERT JOHNSON, OF PUEBLO, COLORADO, ASSIGNOR, BY MESNE ASSIGNMENTS, TO THE CLYMER MANUFACTURING COMPANY, OF DENVER, COLORADO, A CORPORATION OF COLORADO.

SPOTLIGHT FOR AUTOMOBILES.

Application filed March 16, 1921. Serial No. 452,846.

This invention relates to a spot light for automobiles, and more particularly to the mounting means therefor.

The object of the invention is to provide means by which a spot light may be supported for universal movement by the windshield of an automobile.

Other general objects are that the mounting means consist of few numbered parts and adapted for securing to any type of windshield.

The invention is illustrated in the accompanying drawing in which:

Figure 1 is a longitudinal central sectional view of the supporting and operating means for the spot light, Figure 2 is a transverse section on the line 2—2 of Figure 1, Figure 3 is a transverse section on the line 3—3 of Figure 1.

Referring to the drawings more particularly 10 indicates a windshield, a fragmentary section thereof only being shown. An opening 11 is made, preferably in the central portion of the windshield as shown. Within the opening 11 there is held by the means of a pair of rings 12, two hemispherical members 13 and 14. Each ring 12 is formed with a flange 15 and the surface of each ring is formed complemental to the greater peripheral surface of each hemisperical member which it engages. The flanges 15 formed on the rings 12 are adapted to engage upon the marginal edge of the opening 11. The flanges 15 are clamped against the windshield 10 by means of set screws 16, and between each flange 15 and the windshield 10 there is interposed a gasket 17.

Each member 13 and 14 is provided with an annular groove 18, said grooves registering with each other when the members 13 and 14 are in position. A coil spring 19 is positioned within the registering grooves 18 as shown, said spring tending to press the members apart to cause the frictional seating of the members 13 and 14 in the spherical socket formed by the rings 12. The members 13 and 14 are each provided with a transverse registering bore adapted to receive the tubular member 21. The hemispherical member 13 is held against movement upon the tubular member 21 by means of a set screw 22 while the member 14 is permitted to slide upon said tubular member. On the outer end of the tubular member 21 there is slidably mounted a collar 23, said collar having a reduced threaded end 24 adapted to receive the internally threaded boss 25 formed upon the reflector 26. Collar 23 is held against movement upon the tube 21 by means of a screw as indicated at 27.

Within the outer end of the tubular member 21 there is suitably mounted a socket as indicated at 28, said socket being adapted to receive the bulb 29. The tubular member 21 has fitted within it an insulating member 30 through which pass the leads 31 and 32. The outer ends of the leads 31 and 32 are suitably connected to the socket 28 while the inner ends pass through a central bore 33 formed in the handle 34. The inner end of the handle 34 is slipped within the tubular member 21 and easily removable. The leads 31 and 32 are of course connected with a source of supply of electric current, and any suitable switch arrangement, not shown, may be used for energizing the bulb or lamp when so desired.

It is believed from the foregoing description that the operation of the present device may be clearly understood, and that a detailed description thereof will be unnecessary. The handle 34 as before stated, is easily detachable and likewise collar 23 to which the reflector 26 is secured, is removable. By taking off the collar and reflector referred to, and then removing the set screws 13 and one of the rings 12, the remaining parts may be easily dismounted or removed. In mounting the parts in the windshield of an automobile, the operation heretofore described would be simply reversed.

I claim:—

1. A spot light for automobiles, comprising in combination, a wind shield with an opening formed therein, a pair of hemispherical members, means for supporting said members within said opening, a tubular member extending through the central registering openings of said hemispherical members, a reflector detachably carried on the forward end of the tubular member, a lamp socket likewise carried by the forward end of the tubular member, and a handle carried by the rear end of the tube, means for securing one of the hemispherical members against movement upon the tubular member, and spring means for pressing the other hemispherical member against its supporting and mounting means whereby said hemispherical members may be frictionally held in adjusted position.

2. A spotlight mounting comprising in combination, a pair of hemispherical members, a ring fitted upon each hemispherical member, means for securing the rings together, a spring interposed between the abutting faces of said hemispherical members, and means extending centrally through said hemispherical members adapted to support a spotlight upon its one end and an operating handle upon its other end.

3. A spotlight mounting comprising in combination, a pair of hemispherical members, a ring fitted upon each hemispherical member, means for securing the rings together, a spring interposed between the abutting faces of said hemispherical members, a tube extending centrally through said hemispherical members, a spotlight detachably supported by the one end of said tube, and an operating handle supported by the other end of said tube.

4. A spotlight mounting of the character described, comprising in combination, a pair of hemispherical members having their inner faces opposing each other, a housing for said members, said housing being fitted thereon and adapted to permit rotative movement of said members, spring means interposed between said members adapted to urge said members from each other, and means extending through said members adapted to support a spotlight on its one end and an operating handle upon its other end.

5. A spotlight mounting of the character described, comprising in combination, a pair of hemispherical members having their inner faces opposing each other, a housing for said members, said housing being fitted thereon and adapted to permit rotative movement of said members, spring means interposed between said members adapted to urge said members from each other, a tube extending through said hemispherical members centrally thereof, a spotlight detachably positioned upon the other end of said tube, means by which one hemispherical member is secured against movement with relation to said tube and an operating handle carried by the other end of said tube.

6. A spotlight mounting of the character described, comprising in combination, a pair of hemispherical members having their inner faces opposing each other, a housing for said members, said housing being fitted thereon and adapted to permit rotative movement of said members, spring means interposed between said members adapted to urge said members from each other, a tube extending through said hemispherical members centrally thereof, a spotlight detachably supported upon the one end of said tube, a screw extending through one hemispherical member and its inner end engaging upon said tube and adapted to hold said hemispherical member against movement with respect to said tube, and an operating handle supported upon the other end of said tube.

7. A spotlight mounting of the character specified comprising a housing adapted to be secured in an opening in a windshield, said housing including a socket presenting a spherical seat, a pair of members having spherical zones adapted to be frictionally seated within said socket, means for expanding the members to cause the frictional seating of said members, and means extending through said members adapted to support a spotlight on one end and an operating handle on its opposite end.

8. A spotlight mounting of the character specified, comprising a housing adapted to be secured to a windshield, said housing including a spherical socket, a yieldingly expansible member presenting spherical surfaces adapted to be frictionally seated within said socket, and supporting means connected with said expansible member adapted to support at one end a spotlight, and to be manually operated at the other end.

9. A spotlight mounting comprising in combination, a pair of members mounted for universal movement, a bearing ring fitting upon each member, means for securing the rings together, a spring interposed between the abutting faces of said members and means extending centrally through said members adapted to support a spotlight.

10. In a spotlight of the character described, a socket providing a spherical bearing seat and comprising two socket sections each having an opening therethrough, means for securing said socket in an opening in a windshield, a ball comprising two relatively movable portions mounted for universal movement in the seat of said socket, resilient means between said ball portions normally urging the portions from one another and each into engagement with one of said socket sections, a spotlight connected to said ball through the opening in one socket section, and an operating handle connected to said ball through the opening in the other of said socket sections for moving said ball universally and said ball portions relatively toward one another.

11. In a spotlight of the character described, a socket providing a spherical bearing seat and comprising two socket sections each having an opening therethrough, means for securing said socket in an opening in a windshield, a ball comprising two relatively movable portions mounted for universal movement in the seat of said socket, resilient means between said ball portions normally urging the portions from one another and each into engagement with one of said socket sections, a spotlight connected to said ball through the opening in one socket section, an operating handle connected to said ball through the opening in the other of said socket sections for moving said ball universally and said ball portions relatively toward one another, and means for guiding said ball portions during their relative movements.

12. In combination, a universal socket adapted for mounting in an automobile windshield, a ball therein, a spotlight supported by said ball in front of said windshield, an operating handle supported by said ball in the rear of said windshield, said ball comprising two separate ball sections relatively movable, resilient means tending to spread said ball sections into pressure contact with said socket, and axial guide means for retaining said ball sections in definite axial alignment with each other during adjustment of said spotlight.

13. In a spotlight adapted for mounting in automobile windshields, the combination of a spherical socket comprising inner and outer socket sections each of which has an opening therethrough, means for securing said socket in an opening in the windshield, a ball having universal angular adjustment in said spherical socket, said ball comprising two relatively movable portions, a spotlight connected to said ball through the opening in the outer socket section, an operating handle for actuating said ball through the opening in the inner socket section, a stem projecting axially from one of said ball portions and secured thereto and slidingly received axially in the other ball portion for guiding said portions relatively, and a spring adapted to force said portions into pressure contact with said socket.

14. In a spotlight adapted for mounting in automobile windshields, the combination of a spherical socket and a ball having universal angular adjustment in said socket, means for securing said socket in an opening in the windshield, a spotlight for disposal on the outside of the windshield connected to said ball, an operating handle for actuating said spotlight through said ball, said operating handle and said spotlight being aligned on a substantially common axis through said ball, said ball being divided substantially transversely of said axis into two sections movable relatively to each other, an axial stem member retaining two ball sections in alignment during relative movements, and spring means arranged to separate said ball sections from one another into pressure contact with the walls of said spherical socket.

15. In combination, a universal socket comprising two substantially circular rings each having a substantially central opening provided therethrough and each having an upstanding flange portion about the margin of its opening providing an internal spherical seat, said rings being adapted to be placed back to back against opposite faces of a windshield about the perimeter of an opening provided therethrough with said flange portions projecting from one another whereby said flange portions provide a universal socket for a ball member, a two-part ball member within said socket, a plurality of threaded devices passing through said rings at spaced points about said ball member and through the opening in the windshield, resilient means between the parts of said ball normally tending to urge said parts relatively from one another into tight frictional contact with the spherical seats of said rings, a spotlight mounted in connection with one of said ball parts for movement therewith, a handle connected with the other ball part for moving the same universally, means connected to said handle and passing axially through one of said ball parts and through a portion of the other said ball part for guiding the two parts during relative movements, and means for securing one of said ball parts to said guide means whereby movement of said handle axially of said guide means in one direction will compress said resilient means, said other ball part being guided by said guide means during said movement of said handle.

16. In a spot light mounting, the combination with an annular clamping device provided with a spherically rounded interior surface, of a centrally apertured split sphere confined within said surface, a spot light supporting member disposed within the central aperature of said sphere, and means for resiliently expanding the parts of said sphere into frictional engagement with said surface.

17. In combination, an automobile windshield having a hole therethrough, a ball, a universal mounting socket for said ball set in the hole in said windshield, said mounting socket comprising two members secured together over said ball, resilient means normally pressing said ball and said universal mounting socket together, a pair of clamping flanges for said mounting socket embracing the inner and outer sides of said windshield, a spotlight supported by said ball beyond the outer side of said windshield, and an operating handle supported by said ball on the inner side of said windshield.

18. In combination, a generally cylindrical frame adapted to extend through a hole in a glass windshield, said cylindrical frame having a pair of clamping flanges adapted to be connected together to embrace the glass between them, said frame providing a socket member, a lamp having a handle, a ball member mounted in the socket member between the lamp and the handle and a spring for frictionally urging the members together and thereby tending to hold said lamp in its different positions of adjustment.

EBERT JOHNSON.